L. MILNE.
MEANS FOR SECURING ELECTRICAL FITTINGS TO CONDUIT OUTLET BOXES AND THE LIKE.
APPLICATION FILED SEPT. 30, 1918.
1,355,905.
Patented Oct. 19, 1920.
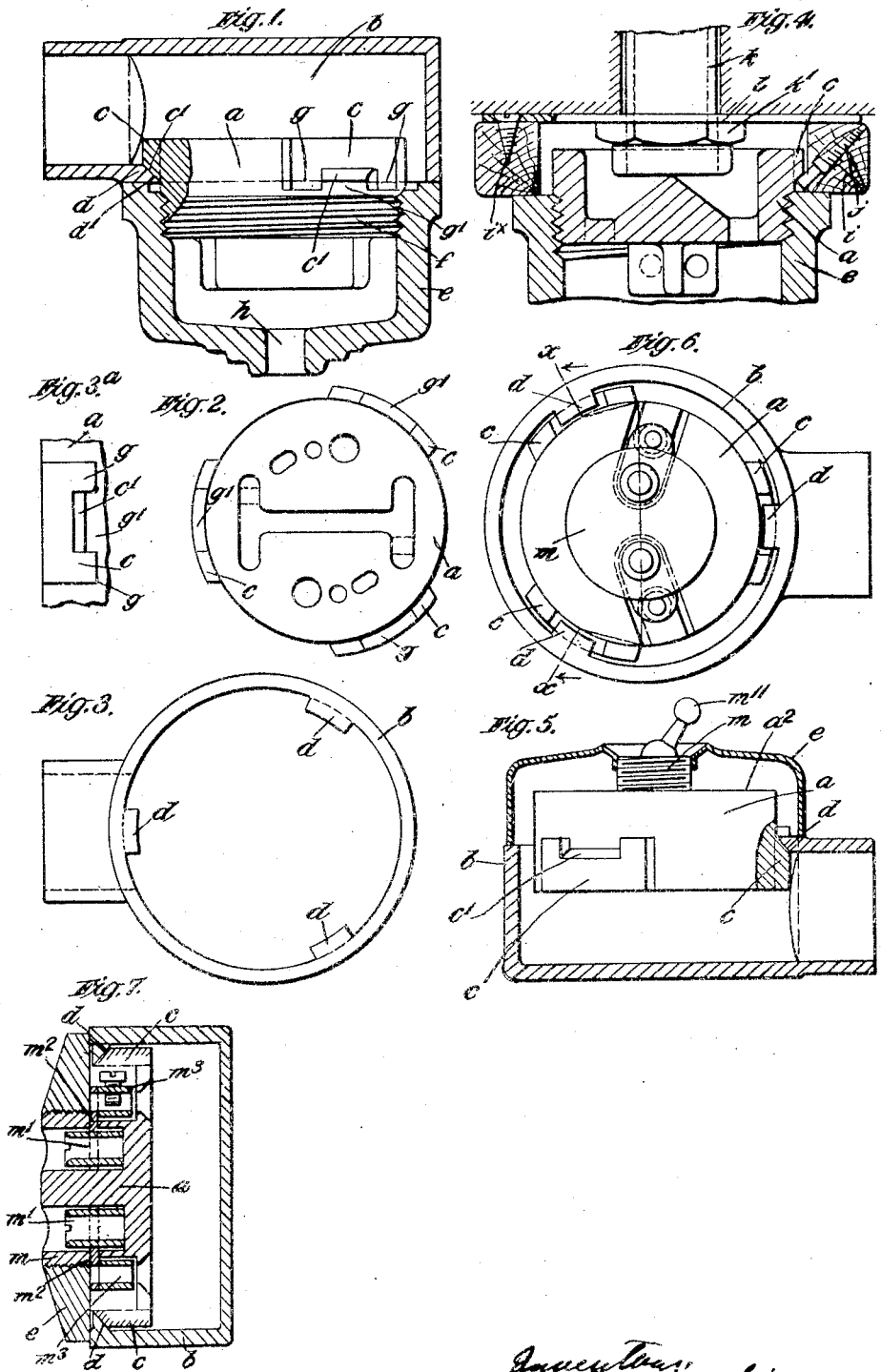

UNITED STATES PATENT OFFICE.

LEONARD MILNE, OF WESTMINSTER, LONDON, ENGLAND.

MEANS FOR SECURING ELECTRICAL FITTINGS TO CONDUIT OUTLET-BOXES AND THE LIKE.

1,355,905.     Specification of Letters Patent.     Patented Oct. 19, 1920.

Application filed September 30, 1918. Serial No. 256,280.

*To all whom it may concern:*

Be it known that I, LEONARD MILNE, a subject of the King of Great Britain, residing at 66 Victoria street, Westminster, in the county of London, England, have invented certain new and useful Improvements in or Relating to Means for Securing Electrical Fittings to Conduit Outlet-Boxes and the like, of which the following is a specification.

This invention relates to means for securing electrical fittings to conduit outlet boxes, and the like, the chief object being to provide for such fittings being assembled in position in a more simple, satisfactory and expeditious manner than heretofore.

According to this invention I employ a base portion which is adapted to receive the electrical elements and is provided with two or more outwardly directed lugs or projections adapted to contact with corresponding inwardly directed lugs or projections on the interior of a member constituting a conduit outlet box, or an annular block, casing or the like, a detachable cover being also provided, and means for drawing said cover and base portion together and maintaining said outwardly and inwardly directed lugs or projections in contact with one another. The said means may be permanently carried partly by said base portion and partly by said cover and become engaged when these parts are assembled. The said cover may, for example, be in screw-threaded engagement with the said base portion and arranged to abut against the conduit outlet box or the like in order to maintain the inwardly and outwardly directed lugs or projections in contact with one another. The said cover is provided with a central opening through which the flexible cords or hard wires attached to the terminals on the base portion can pass, in the case of a ceiling rose, or through which opening the actuating knob can project, in the case of a tumbler switch; or through which opening can pass sockets or socket supports, in the case of a wall socket. To insure the coöperation of the aforesaid lugs or projections with one another, a slight downward pull may be exerted on the flexible cords during the attachment of the said cover to the base portion, in the case of a ceiling rose or on the knob in the case of the switch.

In order that the said invention may be clearly understood and readily carried into effect the same will now be described more fully with reference to the accompanying drawings which show various forms of electrical fittings embodying my invention and in which:—

Figure 1 is a vertical section of a ceiling rose attached to a conduit outlet box.

Fig. 2 is a bottom plan view of the base portion to which the terminals are connected, and Fig. 3 is a bottom plan view of the conduit outlet box to which the said base portion is detachably connected.

Fig. 3ª is a fragmentary elevation taken at right angles to Fig. 2.

Fig. 4 is a vertical section showing a modified form of ceiling rose attached to an annular wooden block.

Fig. 5 is a sectional elevation of a switch of the tumbler type attached to a conduit outlet box.

Fig. 6 is a front elevation showing the socket portion of a wall plug connection, the cover being removed for the purpose of showing the parts more clearly.

Fig. 7 is a section taken approximately on the line $x$—$x$ of Fig. 6.

Like reference characters denote similar parts in all the figures.

Referring first more particularly to Figs. 1, 2, 3 and 3ª $a$ denotes the base portion of the ceiling rose and $b$ the conduit outlet box surrounding the said base portion. The said base portion is shown provided with three equally spaced lugs $c$ adapted to rest upon a corresponding number of lugs $d$ provided on the conduit outlet box, and to be maintained in engagement therewith by means of a cover $e$ in screw threaded engagement with the part $f$ of the base portion $a$. The contacting surfaces $c'$, $d'$ of the said lugs $c$, $d$ are radially inclined so as to facilitate the coöperation of the said lugs and enable effectual engagement of the inner face of the cover $e$ with the conduit outlet box to take place without the necessity of providing any jointing material between these parts. As shown in Fig. 1, the lugs $c$ are provided with depending portions $g$ so as to afford recesses $g'$ for the reception of the lugs $d$ and prevent a relative turning movement between the base portion and the conduit outlet box. The cover $e$ is provided with a central opening $h$ through which the flexible cords attached to the terminals on the base portion can pass. Alternatively, the said recesses may be provided on the lugs on the conduit outlet box and engaged by the lugs on the base portion.

In the modified form of ceiling rose shown in Fig. 4 in which an annular wooden block $i$ surrounding the base portion is employed the block being provided with screws $j$ which are disposed at an inclination and have their inner ends formed as shown in order to contact with the lugs on the base portion $a$ which is secured in position by means of a cover $e$, as aforesaid. In this case the hard wires pass through a conduit tube $k$ to the base portion $a$, to the lower end of which conduit tube the block $i$ is connected by a plate or disk $l$ situated between the ceiling and the said block and secured to the latter by means of screws $i^x$, the said plate or disk $l$ being secured to the conduit tube by a nut $k'$. The cover in this case is also provided with a central opening (not shown) through which flexible cords attached to the terminals on the base portion can pass.

In the adaptation of the invention to a switch of the tumbler type, as shown in Fig. 5, the so-called base portion $a$ is provided with lugs $c$ which coöperate with corresponding lugs $d$ on a conduit outlet box $b$, as aforesaid, the base portion being secured in position by means of the cover $e$ which is adapted to engage with a screw threaded extension $m$ on the portion $a$, in which extension the actuating knob $m'$ is pivotally connected in the usual manner. In cases where the portion $a$ of the switch is disposed completely within the conduit outlet box, the lugs $e$ will be so arranged that when the portion $a$ is in position they will extend above the upper face $a^2$ (Fig. 5) to such an extent as to insure that the inclined surfaces $c'$ of the lugs will coöperate with the corresponding inclined surfaces of the lugs on the conduit outlet box. By constructing switches with metal covers in the manner above described there is avoided the necessity of earthing the actuating knob and cover through the medium of the fastening screws for the base portion as has hitherto been the practice in order to avoid shock from the electric current, since the metal cover being in contact with the "earthed" conduit outlet box effectually "earths" the cover and actuating knob.

In the wall plug connection, shown in Figs. 6 and 7, the so-called base portion $a$ to which are secured the sockets for the reception of the contact pins on the plug, is provided with lugs $c$ adapted to contact with lugs $d$ on a conduit outlet box the base portion being secured in position by means of the cover $e$ which is in screw-threaded engagement with an extension $m$ of the base portion, the said extension being provided with the usual openings for enabling the contact pins on the plug to engage with terminal sockets $m'$ associated with plates $m^2$ detachably mounted in radial slots in the base portion and provided with sockets $m^3$ to which the flexible wire connections are attached.

What I claim and desire to secure by Letters Patent of the United States is:—

1. In electrical fittings, a base portion adapted to receive electrical elements and having outwardly directed projections, a member having on the interior thereof inwardly directed projections with which said outwardly directed projections make contact, a detachable cover, and means for drawing said cover and base portion together and maintaining said outwardly and inwardly directed projections in contact with one another, said means being permanently carried partly by said base portion and partly by said cover and becoming engaged when these parts are assembled.

2. In electrical fittings, a base portion adapted to receive electrical elements and having outwardly directed projections, a member having on the interior thereof inwardly directed projections with which said outwardly directed projections make contact, a detachable cover, means for drawing said cover and base portion together and maintaining said outwardly and inwardly directed projections in contact with one another, said means being permanently carried partly by said base portion and partly by said cover and becoming engaged when these parts are assembled, and means for preventing relative angular movement occurring between said contacting projections during the drawing together of the cover and base portion.

3. In electrical fittings, a base portion adapted to receive electrical elements and having outwardly directed recessed projections provided with radially inclined surfaces, a member having on the interior thereof inwardly directed projections provided with radially inclined surfaces with which the radially inclined surfaces on said outwardly directed recessed projections make contact, a detachable cover, and means for drawing said cover and base portion together and maintaining said outwardly and inwardly directed projections in contact with one another.

4. In electrical fittings, a base portion adapted to receive electrical elements and having outwardly directed projections, a conduit outlet box having on the interior thereof unperforated-radially inclined and inwardly directed projections with which said outwardly directed projections make contact, a detachable cover, and means for drawing said cover and base portion together and maintaining said outwardly and inwardly directed projections in contact with one another.

5. In electrical fittings, a base portion adapted to receive electrical elements and having outwardly directed projections, a conduit outlet box having on the interior thereof inwardly directed projections with which said outwardly directed projections make contact, a detachable cover, and means for drawing said cover and base portion together and maintaining said outwardly and inwardly directed projections in contact with one another, said means being permanently carried partly by said base portion and partly by said cover and becoming engaged when these parts are assembled.

6. In electrical fittings, a base portion adapted to receive electrical elements and having outwardly directed recessed projections, a conduit outlet box having on the interior thereof inwardly directed projections with which said outwardly directed recessed projections make contact, a detachable cover, and means for drawing said cover and base portion together and maintaining said outwardly and inwardly directed projections in contact with one another, said means being permanently carried partly by said base portion and partly by said cover and becoming engaged when these parts are assembled.

7. In electrical fittings, a base portion adapted to receive electrical elements and having outwardly directed recessed projections provided with radially inclined surfaces, a conduit outlet box having on the interior thereof inwardly directed projections provided with radially inclined surfaces with which the radially inclined surfaces on said outwardly directed recessed projections make contact, a detachable cover, and means for drawing said cover and base portion together and maintaining the inclined surfaces of said outwardly and inwardly directed projections in contact with one another, said means being permanently carried partly by said base portion and partly by said cover and becoming engaged when these parts are assembled.

LEONARD MILNE.